United States Patent
Foster et al.

(10) Patent No.: US 9,423,018 B1
(45) Date of Patent: Aug. 23, 2016

(54) TECHNOLOGIES FOR VARIATOR COOLING

(71) Applicant: Allison Transmission, Inc., Indianapolis, IN (US)

(72) Inventors: Michael Foster, Carmel, IN (US); James Raszkowski, Indianapolis, IN (US); Brian Schoolcraft, Crawfordsville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 14/678,346

(22) Filed: Apr. 3, 2015

(51) Int. Cl.
*F16H 57/04* (2010.01)
*F16H 15/50* (2006.01)

(52) U.S. Cl.
CPC ........ *F16H 57/0487* (2013.01); *F16H 15/503* (2013.01); *F16H 57/0412* (2013.01); *F16H 57/0423* (2013.01)

(58) Field of Classification Search
None
See application file for complete search history.

(56) References Cited

U.S. PATENT DOCUMENTS

| | | | |
|---|---|---|---|
| 2,347,873 A | 5/1944 | Bloomfield |
| 2,410,818 A | 11/1946 | Grant |
| 2,554,221 A | 5/1951 | Stephenson et al. |
| 2,583,843 A | 1/1952 | Herrick |
| 2,596,654 A | 5/1952 | Clark et al. |
| 2,718,292 A | 9/1955 | Meilander et al. |
| 2,841,330 A | 7/1958 | Brewer et al. |
| 3,324,744 A | 6/1967 | Roper |
| 3,432,016 A | 3/1969 | Vogt |
| 3,481,436 A | 12/1969 | Wilkowski |
| 3,631,741 A | 1/1972 | Kelbel |
| 4,107,776 A | 8/1978 | Beale |
| 4,114,478 A | 9/1978 | Clauss |
| 4,361,217 A | 11/1982 | Bieber et al. |
| 4,381,828 A | 5/1983 | Lunn et al. |
| 4,813,524 A | 3/1989 | Reik |
| 5,062,050 A | 10/1991 | Petzoid et al. |
| 5,152,726 A | 10/1992 | Lederman |
| 5,355,981 A | 10/1994 | Itoh et al. |
| 5,407,024 A | 4/1995 | Watson et al. |
| 5,441,130 A | 8/1995 | Ha |
| 5,538,121 A | 7/1996 | Hering |
| 5,584,776 A | 12/1996 | Wellant et al. |

(Continued)

FOREIGN PATENT DOCUMENTS

| | | |
|---|---|---|
| EP | 1519084 A2 | 3/2005 |
| WO | 9849455 A2 | 11/1998 |
| WO | 2010048029 A2 | 4/2010 |

OTHER PUBLICATIONS

International Search Report and Written Opinion received by PCT International Application No. PCT/US2013/045580, completed Oct. 27, 2013, 3 pages.

(Continued)

*Primary Examiner* — Dirk Wright
(74) *Attorney, Agent, or Firm* — Barnes & Thornburg LLP

(57) ABSTRACT

A variator and methods for making the variator are disclosed. The variator includes a plurality of spheres and a plurality of fluid conduits. The plurality of spheres are arranged circumferentially about a central axis and configured to be positioned between an input disc and an output disc. The plurality of fluid conduits each include (i) an inlet positioned radially outward of the plurality of spheres and (ii) an outlet positioned radially inward of the inlet and fluidly coupled to the inlet to deliver fluid received by the inlet to at least one of the plurality of spheres.

20 Claims, 9 Drawing Sheets

(56) References Cited

U.S. PATENT DOCUMENTS

| | | |
|---|---|---|
| 5,653,322 A | 8/1997 | Vasa et al. |
| 5,662,198 A | 9/1997 | Kojima et al. |
| 5,704,867 A | 1/1998 | Bowen |
| 5,771,477 A | 6/1998 | Showalter et al. |
| 5,833,566 A | 11/1998 | Showalter |
| 5,884,526 A | 3/1999 | Fogelberg |
| 5,893,812 A | 4/1999 | Narai et al. |
| 5,918,715 A | 7/1999 | Ruth et al. |
| 5,992,592 A | 11/1999 | Showalter |
| 6,062,361 A | 5/2000 | Showalter |
| 6,149,540 A | 11/2000 | Johnson et al. |
| 6,149,543 A | 11/2000 | Breen |
| 6,155,395 A | 12/2000 | Braford |
| 6,251,045 B1 | 6/2001 | Oliveira et al. |
| 6,460,671 B1 | 10/2002 | Karambelas et al. |
| 6,588,559 B2 | 7/2003 | Blair |
| 6,672,442 B2 | 1/2004 | Kato et al. |
| 6,679,367 B2 | 1/2004 | Baker et al. |
| 6,790,153 B2 | 9/2004 | Goto |
| 6,834,750 B2 | 12/2004 | Baker et al. |
| 6,846,257 B2 | 1/2005 | Baker et al. |
| 7,052,430 B2 | 5/2006 | Stevenson et al. |
| 7,189,182 B2 | 3/2007 | Stevenson et al. |
| 7,204,337 B2 | 4/2007 | Wildfellner |
| 7,219,569 B2 | 5/2007 | Jastzembowski et al. |
| 8,152,673 B2 | 4/2012 | Yanay |
| 8,298,112 B2 | 10/2012 | Takada |
| 8,313,405 B2 * | 11/2012 | Bazyn ............... F16H 15/52 475/185 |
| 2002/0005325 A1 | 1/2002 | Yamada |
| 2003/0051959 A1 | 3/2003 | Blair |
| 2003/0226415 A1 | 12/2003 | Baker et al. |
| 2004/0104096 A1 | 6/2004 | Genise |
| 2006/0189435 A1 | 8/2006 | Flaig et al. |
| 2009/0118912 A1 | 5/2009 | Hugenroth et al. |
| 2011/0144872 A1 | 6/2011 | Long et al. |
| 2012/0072084 A1 | 3/2012 | Stoller et al. |
| 2013/0338888 A1 | 12/2013 | Long et al. |
| 2013/0338889 A1 | 12/2013 | Long et al. |
| 2013/0338891 A1 | 12/2013 | Long et al. |

OTHER PUBLICATIONS

U.S. Appl. No. 61/660,666, dated Dec. 16, 2009, (31 pages).
Utility U.S. Appl. No. 14/678,348, dated Apr. 3, 2015.
Search Report and Written Opinion from the International Searching Authority for Application No. PCT/US2016/025184, dated May 27, 2016, 7 pages.

* cited by examiner

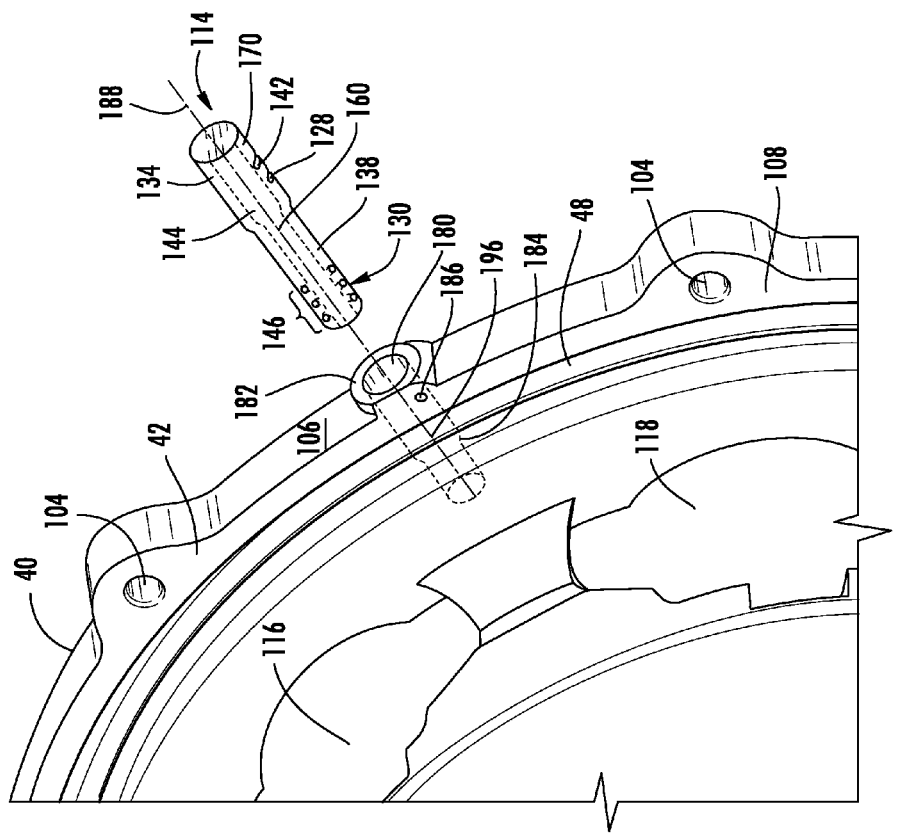
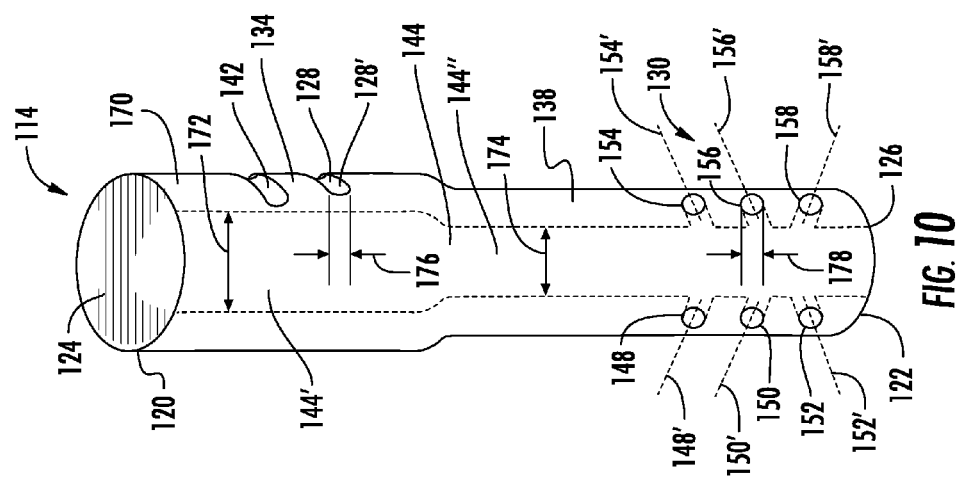
FIG. 11
FIG. 10

TECHNOLOGIES FOR VARIATOR COOLING

Cross-reference is made to co-pending U.S. utility patent application "MANUFACTURING TECHNIQUE FOR VARIATOR COOLING TECHNOLOGIES," U.S. patent application Ser. No. 14/678,348 by Michael Foster, et al., which is filed concurrently with this application and is expressly incorporated by reference.

TECHNICAL FIELD

The present disclosure relates generally to continuously variable transmissions, and more particularly, to continuously variable transmissions that include a planetary-type variator.

BACKGROUND

Continuously variable transmissions (CVTs) utilize a variable-ratio unit or "variator" to provide a continuous variation of transmission speed ratios rather than a series of predetermined speed ratios as provided in typical transmissions. A planetary-type variator is one such variator that includes an input ring, an output ring, and at least one sphere arranged between the input and output rings. The at least one sphere is configured to tilt between the input and output rings to transmit torque from the input ring to the output ring so that continuously-variable torque output is produced using the planetary-type variator.

One method for cooling the sphere(s) of a planetary-type variator, sometimes referred to as splash lubrication or splash feed lubrication, includes splashing the sphere(s) with fluid (e.g., oil) in response to the action of one or more moving parts of the variator. Another method for cooling the sphere(s) of a planetary-type variator includes delivering fluid to the sphere(s) directly through one or more rotating components of the variator, such as, for example, a shaft that defines a centerline of the variator. As a result of limitations associated with these methods, alternative approaches for cooling the sphere(s) of a planetary-type variator remain an area of interest.

SUMMARY

According to one aspect of the present disclosure, a variator for an automatic transmission includes a plurality of spheres and a plurality of fluid conduits. The plurality of spheres are arranged circumferentially about a central axis and configured to be positioned between an input disc and an output disc. Each of the plurality of fluid conduits includes an inlet positioned radially outward of the plurality of spheres and an outlet positioned radially inward of the inlet that is fluidly coupled to the inlet to deliver fluid received by the inlet to at least one of the plurality of spheres.

In some embodiments, the variator may include a case that has a flange that is positioned radially outward from the plurality of spheres, and the plurality of fluid conduits may extend radially inward from the case. The case may be configured to engage a housing of the transmission. Additionally, in some embodiments, the variator may include a plurality of retaining pins positioned radially inward of the case, and each of the plurality of retaining pins may be engaged with one of the plurality of fluid conduits and the case to secure each of the plurality of fluid conduits to the case in a predetermined orientation. Each of the plurality of fluid conduits may include a first section having a first diameter and a second section extending radially inward from the first section and having a second diameter less than the first diameter, and the first section of each of the plurality of fluid conduits may be engaged with one of the plurality of retaining pins. Furthermore, in some embodiments, the case may include a groove that extends substantially around the central axis and is positioned radially outward from the plurality of spheres, and the plurality of retaining pins may be positioned radially outward from the groove.

In some embodiments, the outlet of each of the plurality of fluid conduits may include a plurality of output ports, and at least one of the plurality of output ports may be configured to deliver fluid radially inward to at least one of the plurality of spheres. Each of the fluid conduits may be formed to include a passageway that extends radially inward from the inlet to fluidly couple the inlet to each of the plurality of output ports.

According to another aspect of the present disclosure, an assembly includes a case, a plurality of spheres, and a plurality of fluid conduits. The case includes a flange having an outer surface, a plurality of holes that extend radially inward through the outer surface, and a groove that extends substantially around a central axis and is configured to receive fluid. The plurality of spheres are arranged circumferentially about the central axis and positioned radially inward of the groove. The plurality of fluid conduits are positioned in the plurality of holes, and each of the plurality of fluid conduits includes an inlet fluidly coupled to the groove to receive fluid therefrom and an outlet positioned radially inward of the inlet that is fluidly coupled to the inlet to deliver fluid received by the inlet to at least one of the plurality of spheres.

In some embodiments, the case may be configured to engage a housing of a transmission. Additionally, in some embodiments, the assembly may include a plurality of retaining pins positioned radially inward of the case, and each of the plurality of retaining pins may be engaged with one of the plurality of fluid conduits and the case to secure each of the plurality of fluid conduits to the case in a predetermined orientation. Each of the plurality of fluid conduits may include a first section having a first diameter and a second section extending radially inward from the first section and having a second diameter less than the first diameter, and the first section of each of the plurality of fluid conduits may be engaged with one of the plurality of retaining pins. Each of the plurality of holes may be a counterbored hole that extends radially inward from one of a plurality of shoulders of the case, and the first section of each of the plurality of fluid conduits may be engaged with one of the plurality of shoulders of the case.

In some embodiments, the outlet of each of the plurality of fluid conduits may include a plurality of output ports, and at least one of the plurality of output ports may be configured to deliver fluid radially inward to at least one of the plurality of spheres. The plurality of output ports may include three output ports configured to deliver fluid to at least one of the plurality of spheres. Additionally, in some embodiments, each of the plurality of output ports may have a diameter within the range of 1.0 millimeter to 1.5 millimeters.

In some embodiments, the inlet of each of the plurality of fluid conduits may have a diameter within the range of 3.0 millimeters to 3.5 millimeters.

According to yet another aspect of the present disclosure, a transmission includes a variator and a first hydraulic circuit. The variator includes a plurality of spheres arranged circumferentially about a central axis between an input disc and an output disc, and a variator hydraulic circuit fluidly coupled to a fluid source and configured to deliver fluid supplied by the fluid source to the plurality of spheres at a variator pressure. The variator hydraulic circuit has a plurality of fluid conduits each configured to conduct fluid from an inlet of each of the plurality of fluid conduits that is positioned radially outward of the plurality of spheres to an outlet of each of the plurality of fluid conduits that is positioned radially inward of the inlet to deliver fluid to at least one of the plurality of spheres. The first hydraulic circuit is fluidly coupled to the fluid source and configured to deliver fluid supplied by the fluid source to first torque transmitting mechanisms of the transmission separate from the plurality of spheres at a first pressure different from the variator pressure.

In some embodiments, the inlet of each of the plurality of fluid conduits may have a diameter within the range of 3.0 millimeters to 3.5 millimeters. The outlet of each of the plurality of fluid conduits may include a plurality of output ports, and each of the plurality of output ports may have a diameter within the range of 1.0 millimeter to 1.5 millimeters.

According to another aspect of the present disclosure still, a method of making a variator includes forming a plurality of holes in a surface of a case that includes a flange, arranging a plurality of spheres in the case that are configured to be positioned between an input disc and an output disc circumferentially about a central axis so that the plurality of spheres are positioned radially inward of the flange, and positioning a plurality of fluid conduits in the plurality of holes.

In some embodiments, positioning the plurality of fluid conduits in the plurality of holes may include advancing the plurality of fluid conduits in the plurality of holes so that an inlet of each of the plurality of fluid conduits configured to receive fluid is positioned radially outward of the plurality of spheres and an outlet of each of the plurality of fluid conduits configured to deliver fluid received by the inlet to at least one of the plurality of spheres is positioned radially inward of the inlet.

In some embodiments, the method may further include engaging each of the plurality of fluid conduits and the case with a retaining pin positioned radially inward of the case to secure each of the plurality of fluid conduits to the case in a predetermined orientation. Engaging each of the plurality of fluid conduits and the case with the retaining pin may include engaging a first section of each of the plurality of fluid conduits having a first diameter greater than a second diameter of a second section of each of the plurality of fluid conduits with the retaining pin. Forming the plurality of holes in the case may include forming a plurality of counterbored holes in the case that each extends radially inward from one of a plurality of shoulders of the case, and positioning the plurality of fluid conduits in the plurality of holes may include engaging the first section of each of the plurality of fluid conduits with one of the plurality of shoulders of the case. Additionally, in some embodiments, the method may include forming a groove in the case that extends substantially around the central axis and is positioned radially inward of each of the retaining pins. Furthermore, in some embodiments, the method may include forming a groove in the case that extends substantially around the central axis, and positioning the plurality of fluid conduits in the plurality of holes may include advancing the plurality of fluid conduits in the plurality of holes so that the inlet of each of the plurality of fluid conduits is fluidly coupled to the groove. Further still, in some embodiments, positioning the plurality of fluid conduits in the plurality of holes may include advancing the plurality of fluid conduits in the plurality of holes so that at least one output port of the outlet of each of the plurality of fluid conduits is configured to deliver fluid radially inward to at least one of the plurality of spheres.

According to yet another aspect of the present disclosure still, a method of making a variator includes forming a plurality of holes in a case and a groove that extends substantially around a central axis and is configured to receive fluid in the case, arranging a plurality of spheres in the case that are configured to be positioned between an input disc and an output disc circumferentially about the central axis, forming each of a plurality of fluid conduits, and positioning the plurality of fluid conduits in the plurality of holes so that each of the plurality of fluid conduits extends radially inward from the case and each of the fluid conduits is fluidly coupled to the groove to receive fluid therefrom.

In some embodiments, forming each of the plurality of fluid conduits may include forming a passageway in a tube, forming an inlet in the tube that extends through the tube to open into the passageway, and forming an outlet including a plurality of output ports in the tube that each extend through the tube to open into the passageway. Forming the inlet in the tube of each of the plurality of fluid conduits may include forming an opening having a diameter within the range of 3.0 millimeters to 3.5 millimeters in the tube of each of the plurality of fluid conduits. Additionally, in some embodiments, forming the outlet including the plurality of output ports in the tube of each of the plurality of fluid conduits may include forming six output ports each having a diameter within the range of 1.0 millimeter to 1.5 millimeters in the tube of each of the plurality of fluid conduits. Furthermore, in some embodiments, positioning the plurality of fluid conduits in the plurality of holes may include advancing the plurality of fluid conduits in the plurality of holes so that the inlet of each of the plurality of fluid conduits is positioned radially outward of the plurality of spheres and fluidly coupled to the groove to receive fluid therefrom and the outlet of each of the plurality of fluid conduits is positioned between two of the plurality of spheres to deliver fluid received by the inlet to the two of the plurality of spheres.

In some embodiments, the method may include engaging each of the plurality of fluid conduits and the case with a retaining pin positioned radially inward of the case to secure each of the plurality of fluid conduits to the case in a predetermined orientation. Engaging each of the plurality of fluid conduits and the case with the retaining pin may include engaging a first section of each of the plurality of fluid conduits having a first diameter greater than a second diameter of a second section of each of the plurality of fluid conduits with the retaining pin. Forming the plurality of holes in the case may include forming a plurality of counterbored holes in the case that each extends radially inward from one of a plurality of shoulders of the case, and positioning the plurality of fluid conduits in the plurality of holes may include engaging the first section of each of the plurality of fluid conduits with one of the plurality of shoulders of the case.

In some embodiments, arranging the plurality of spheres in the case circumferentially about the central axis may include arranging the plurality of spheres in the case circumferentially about the central axis so that the plurality of spheres are positioned radially inward of the groove.

Finally, according to yet another aspect of the present disclosure, a method of providing fluid to a variator for an automatic transmission includes supplying fluid from a fluid source at a first pressure to first torque transmitting mechanisms of the transmission via a first hydraulic circuit of the transmission, and supplying fluid from the fluid source at a variator pressure different from the first pressure to a plurality of spheres of the variator arranged circumferentially about a central axis between an input disc and an output disc of the variator via a hydraulic circuit of the variator so that fluid is conducted from inlets of a plurality of fluid conduits of the variator hydraulic circuit that are positioned radially outward of the plurality of spheres to outlets of the plurality of fluid conduits that are positioned radially inward of the inlets.

In some embodiments, supplying fluid from the fluid source at the variator pressure to the plurality of spheres may include delivering fluid to the inlets of the plurality of fluid conduits through a case of the variator configured to engage a housing of the transmission. Delivering fluid to the inlets of the plurality of fluid conduits through the case of the variator may include circulating fluid to the inlets of the plurality of fluid conduits substantially around the central axis via a groove formed in the case.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 10 is a perspective view of the fluid conduit of FIG. 4;

FIG. 11 is a perspective view of the fluid conduit of FIG. 4 aligned with one hole of the case.

DETAILED DESCRIPTION OF THE DRAWINGS

Figure 1:
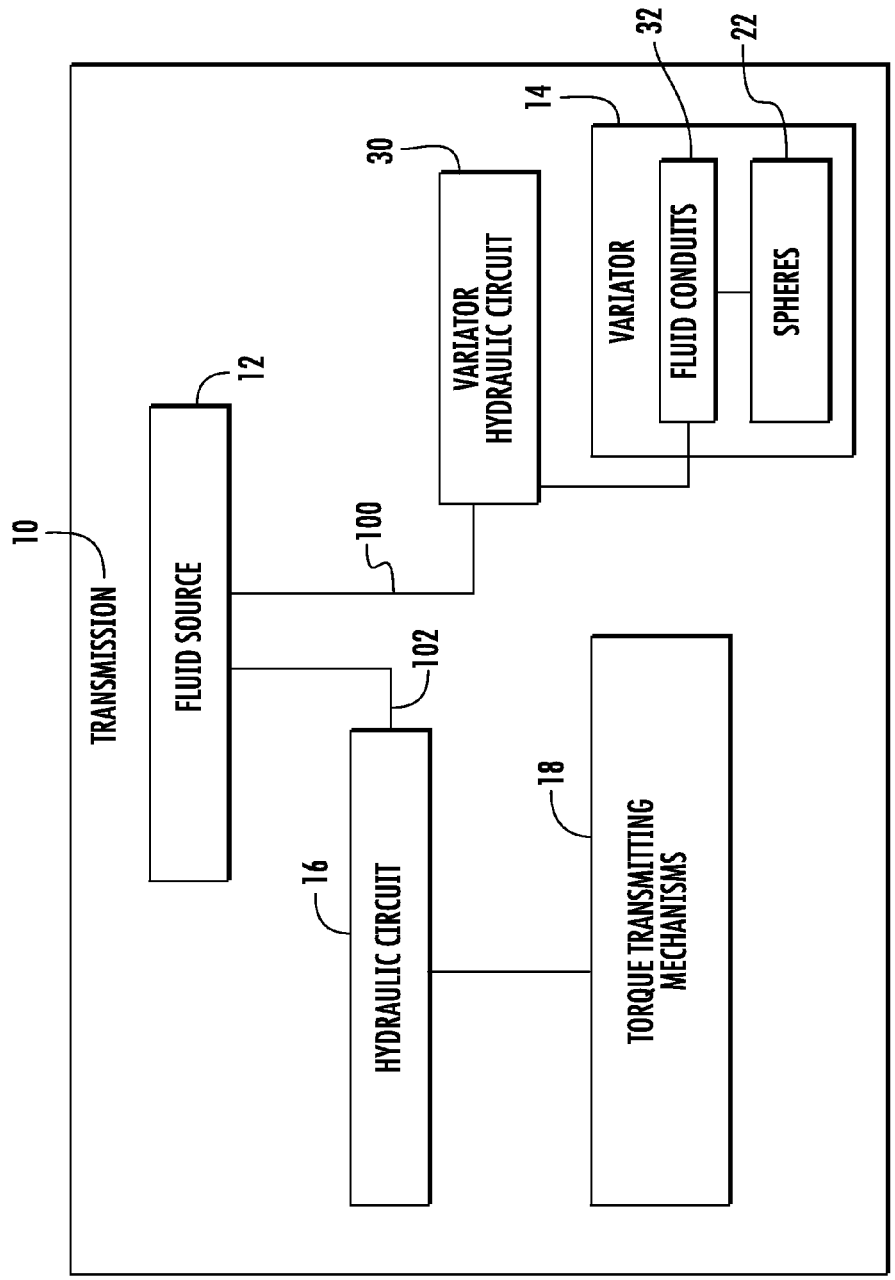
FIG. 1 is a simplified block diagram of a transmission including a planetary-type variator.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative transmission 10 is shown. The transmission 10 may be included in a motor vehicle and coupled between a drive unit and a vehicle load to ensure the controlled application of rotational power generated by the drive unit to the vehicle load. Specifically, the transmission 10 may be operable in a number of operating modes to transmit rotational power generated by the drive unit to the vehicle load to propel the vehicle load in a forward direction and/or a reverse direction.

The transmission 10 is illustratively embodied as an automatic, continuously variable transmission (CVT) that includes a fluid source 12, a variator 14 coupled to the fluid source 12, a hydraulic circuit 16 coupled to the fluid source 12, and a number of torque transmitting mechanisms 18 coupled to the hydraulic circuit 16 as shown in FIG. 1. The fluid source 12 is illustratively a sump or fluid reservoir configured to store fluid (i.e., oil) for subsequent delivery to the variator 14 and the hydraulic circuit 16. The variator 14 is operable to enable the transmission 10 to provide a variable range of speed ratios (i.e., ratios defined by the rotational speeds of the input to the transmission 10 to the rotational speeds of the output of the transmission 10) in one or more operating modes. The hydraulic circuit 16 is configured to deliver fluid supplied by the fluid source 12 to the torque transmitting mechanisms 18. The torque transmitting mechanisms 18 may include gearsets as well as clutches that may be selectively engaged during operation of the transmission 10 to transmit rotational power between components of the transmission 10 (e.g., between a transmission input shaft, one or more gearsets, and a transmission output shaft).

The variator 14 is illustratively embodied as a planetary-type variator that includes a number of planets or spheres 22 as shown in FIG. 1. Because the variator 14 is a traction drive device, the spheres 22 transmit torque between the input and output shafts of the transmission 10 during operation of the variator 14 via traction fluid. The spheres 22 must be cooled and lubricated to resist wear as the spheres 22 transmit torque between the input and output shafts of the transmission 10. A variator hydraulic circuit 30 is configured to deliver fluid from the fluid source 12 to the spheres 22 to cool and lubricate the spheres 22 during operation of the variator 14. Specifically, as described in greater detail below, the variator hydraulic circuit 30 is configured to deliver fluid from the fluid source 12 to a number of fluid conduits 32 of the variator 14 that are configured to supply fluid to the spheres 22.

Fluid supplied by the fluid source 12 is illustratively delivered separately to the spheres 22 and the torque transmitting mechanisms 18 as shown in FIG. 1. Specifically, fluid from the fluid source 12 is delivered to the spheres 22 via the conduits 32 of the variator hydraulic circuit 30 at a variator pressure 100, and fluid from the fluid source 12 is delivered to the torque transmitting mechanisms 18 via the hydraulic circuit 16 at a pressure 102. The variator pressure 100 and the pressure 102 are illustratively different from one another. It should be appreciated, however, that in other embodiments, the variator pressure 100 and the pressure 102 may be similar or substantially equivalent to one another.

Figure 2:
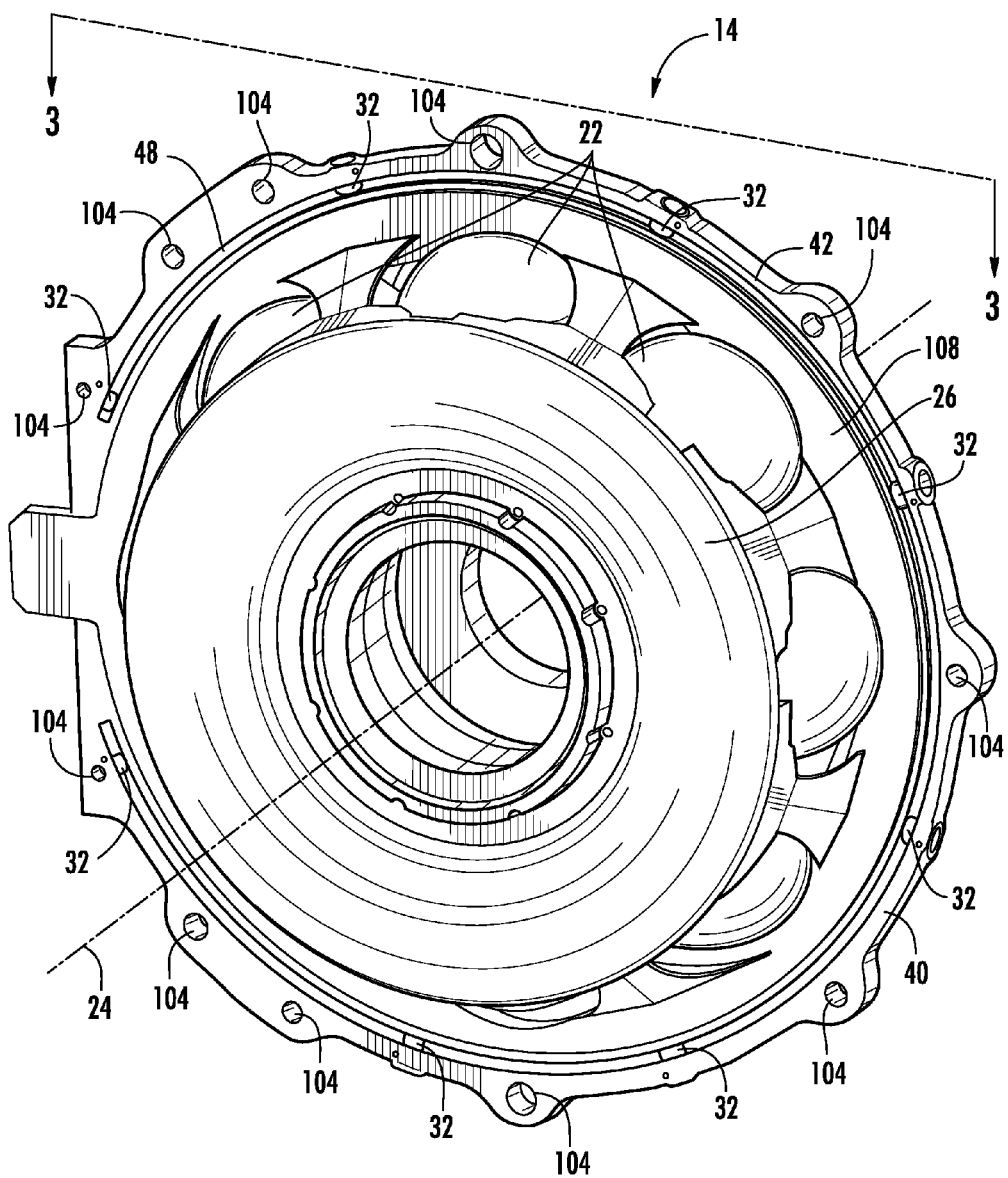
FIG. 2 is a perspective view of the variator of FIG. 1.
Figure 3:
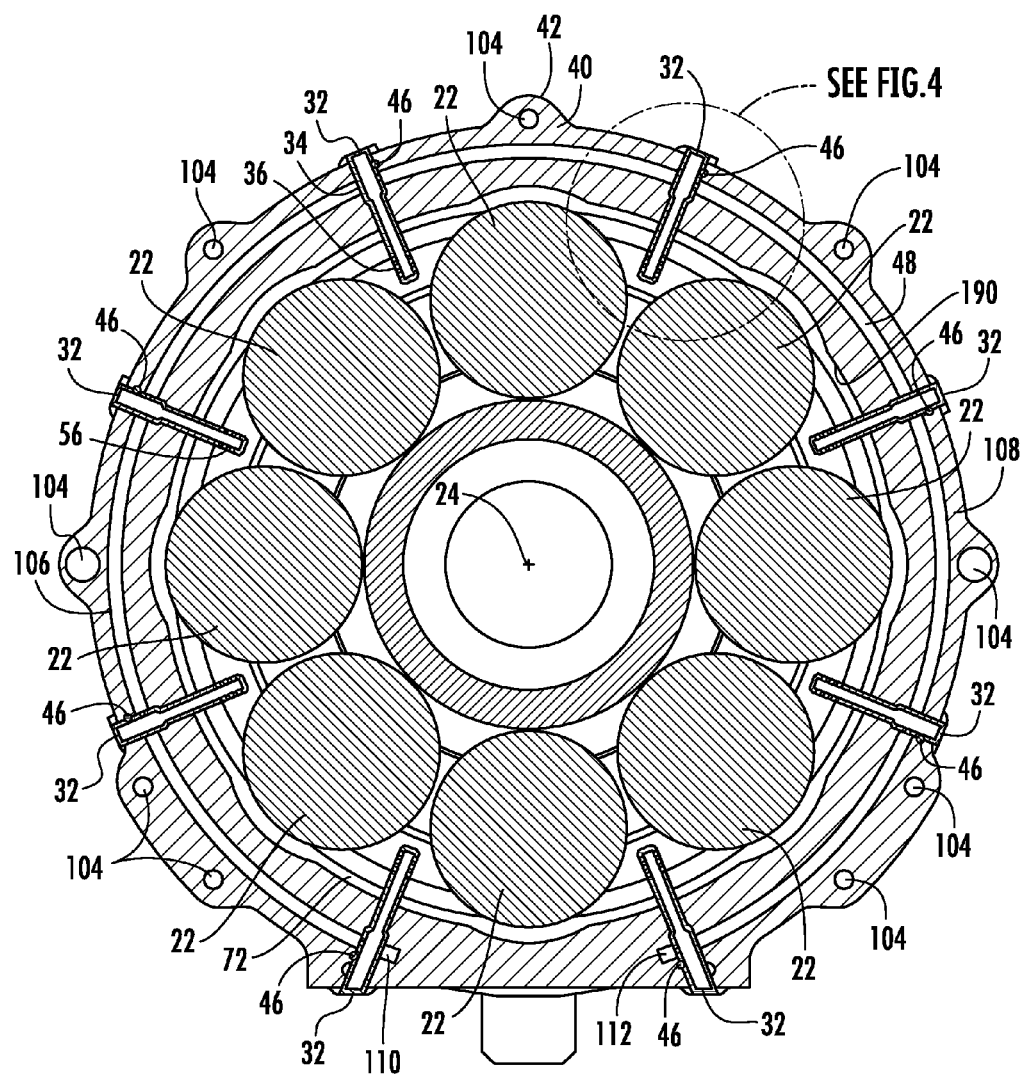
FIG. 3 is a front sectional view of the variator of FIG. 2 about a line 3-3.

Referring now to FIG. 2, the spheres 22 are circumferentially arranged about a central axis 24 and positioned between an input disc 26 and an output disc (not shown) of the variator 14. The spheres 22 of the variator 14 illustratively include eight spheres, as best seen in FIG. 3. It should be appreciated, however, that in other embodiments, the spheres 22 of the variator 14 may include more or less than eight spheres.

The variator 14 further includes a stator or case 40 that extends around the spheres 22 as shown in FIG. 2. The fluid conduits 32 are illustratively secured to the case 40 such that the conduits 32 extend radially inward from the case 40 toward the axis 24. In this way, as described in more detail below, the conduits 32 extend radially inward from the case 40 toward the axis 24 to deliver fluid to the spheres 22 arranged about the axis 24. As used herein, the term "radially" refers to the radial direction that is orthogonal to the axial direction along which the axis 24 extends. Thus, when one component is referred to as being positioned radially outward of another component, the one component is positioned farther away from the axis 24 than the another component in the radial direction. Conversely, when one component is referred to as being positioned radially inward of another component, the one component is positioned closer to the axis 24 than the another component in the radial direction.

The case 40 is illustratively a metallic component configured to engage a housing of the transmission 10. Specifically, the case 40 includes a flange 42 that defines the outer circumference of the case 40 and surrounds a central cavity 72 defined in the case 40. The flange 42 is configured to engage the housing of the transmission 10 and includes one or more apertures 104 that are sized to receive fasteners (not shown) used to couple the case 40 to the housing of the transmission 10. Because the case 40 is secured to the stationary housing of the transmission 10, the case 40 is a stationary component of the variator 14. The flange 42 includes a planar, circumferential face 108 that is arranged to confront the housing of the transmission 10 to seal an annular groove 48 formed in the face 108 when the flange 42 is engaged with the housing of the transmission. The groove 48 extends substantially around the axis 24 as shown in FIG. 2.

Referring now to FIG. 3, the spheres 22 are arranged circumferentially about the axis 24 in the central cavity 72. A fluid conduit 32 extends through the case 40 into the central cavity 72 between each pair of the spheres 22. Specifically, the conduit 32 extends through an outer circumferential surface 106 of the flange 42 and an inner circumferential surface 190 into the central cavity 72 between each pair of the spheres 22. In total, the fluid conduits 32 illustratively include eight fluid conduits that are substantially identical to one another. As described in greater detail below, each fluid conduit 32 is configured to deliver fluid to each pair of adjacent spheres 22. It should be appreciated, however, that in other embodiments, more or less than eight fluid conduits may be provided to ensure sufficient fluid is delivered to the spheres 22 to cool and lubricate the spheres 22 during operation of the variator 14. For example, the variator 14 may include only four fluid conduits that are each configured to deliver fluid to two spheres that are arranged circumferentially adjacent one another about the axis 24.

The variator 14 further includes a number of retaining pins 46 that secure the fluid conduits 32 to the case 40. The retaining pins 46 illustratively include eight retaining pins that are substantially identical to one another. Each of the eight retaining pins 46 is used to secure one of the eight fluid conduits 32 to the case 40 in a predetermined orientation, as described in greater detail below. It should be appreciated, however, that in other embodiments, more or less than eight retaining pins may be used depending on the number of fluid conduits included in the variator 14.

The groove 48 formed in the face 108 is positioned radially outward from the spheres 22 and radially inward from the retaining pins 46. The groove 48 is sized to conduct fluid supplied thereto by the variator hydraulic circuit 30. Specifically, the groove 48 is fluidly coupled to the variator hydraulic circuit 30 at an inlet 110 so that fluid from the fluid source 12 is supplied to the groove 48 via the circuit 30 at the inlet 110. From the inlet 110, the groove 48 circulates fluid about the axis 24 to the fluid conduits 32 and thereafter to an outlet 112. Fluid circulated to the outlet 112 may be recirculated back to the inlet 110 by the hydraulic circuit 30. It should be appreciated that fluid may be supplied to the groove 48 via the hydraulic circuit 30 at the outlet 112 rather than the inlet 110. In that case, the groove 48 may circulate fluid from the outlet 112 about the axis 24 to the fluid conduits 32 and thereafter to the inlet 110. It should also be appreciated that fluid may be supplied to the groove 48 via the hydraulic circuit 30 at both the locations 110, 112. In that case, the supply of fluid to the groove 48 at both the locations 110, 112 may mitigate a pressure drop that results as fluid is circulated about the axis 24 via the groove 48. In any case, as described in greater detail below, the fluid conduits 32 are configured to receive fluid from the fluid source 12 via the groove 48 prior to delivering fluid to the spheres 22.

The conduits 32 include inlets 34 and outlets 36 as shown in FIG. 3. The inlets 34 are positioned in the groove 48 radially outward of the spheres 22, and the outlets 36 are positioned radially inward of the inlets 34. Fluid enters the conduits 32 through the inlets 34 and advances radially inward to the outlets 36. Fluid exits the conduits 32 through the outlets 36 and is directed toward the spheres 22.

Referring now to FIG. 10, one conduit 114 of the fluid conduits 32 is shown in greater detail. It should be appreciated that in the illustrative embodiment, the other fluid conduits 32 are each identical to the conduit 114. The conduit 114 includes an outer body or tube 170 having a section 134 and a section 138. The sections 134, 138 are interconnected to one another, and the section 134 has a diameter 136 that is illustratively greater than a diameter 140 of the section 138. The section 134 includes a cap 120, and the section 138 includes a tip 122. The cap 120 and the tip 122 define opposite ends 124, 126 of the conduit 114, respectively.

As described above, each conduit 32 includes an inlet 34 (identified by numeral 128 in FIG. 10) and an outlet 36 (identified by numeral 130 in FIG. 10). In addition to the inlet 128 and the outlet 130, the conduit 114 includes a notch 142. The inlet 128 and the notch 142 are formed in the section 134 of the tube 170, and the outlet 130 is formed in the section 138 of the tube 170. The inlet 128 and the notch 142 are positioned closer to the cap 120 than the tip 122, and the outlet 130 is positioned closer to the tip 122 than the cap 120.

Figure 4:
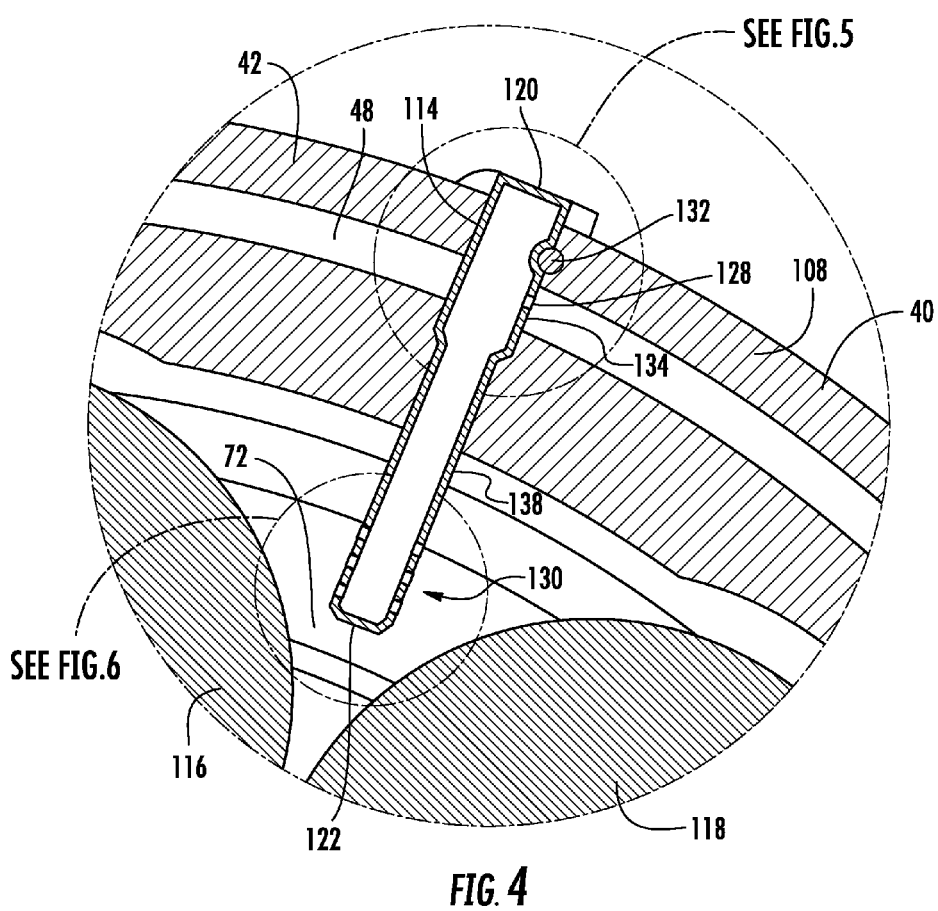
FIG. 4 is a detail view of one fluid conduit and two spheres of the variator of FIG. 3.

Referring now to FIG. 4, the conduit 114 is shown installed in the case 40 so that the conduit 114 is positioned between a pair of spheres 116, 118. It should be appreciated that each of the other fluid conduits 32 is installed in the case 40 so that each of the other fluid conduits 32 is positioned between two of the spheres 22 in substantially identical fashion to the illustrative installation of the fluid conduit 114.

Figure 5:
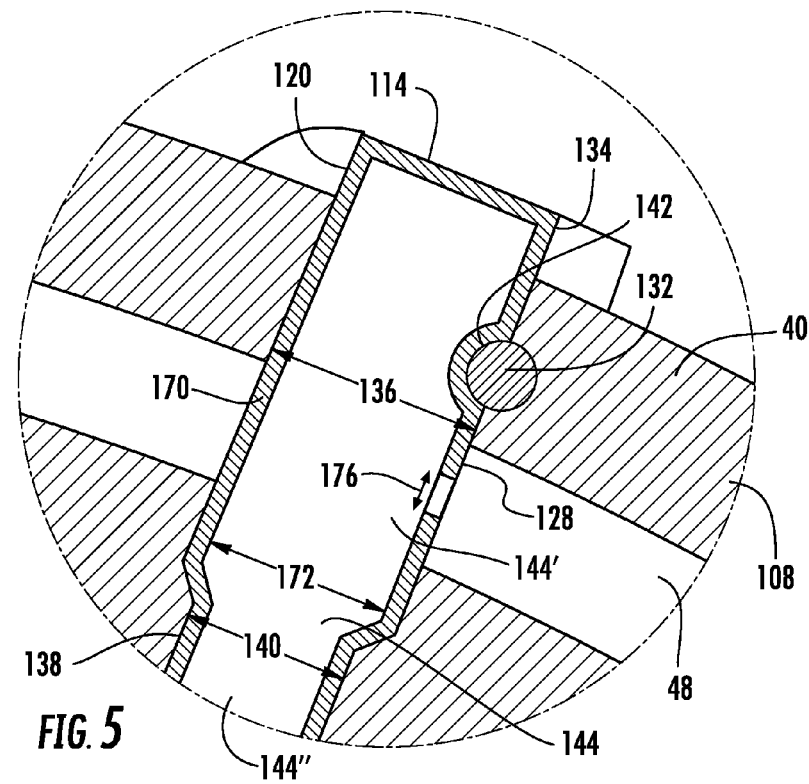
FIG. 5 is a sectional view of the fluid conduit of FIG. 4 engaged with a case of the variator.
Figure 12:
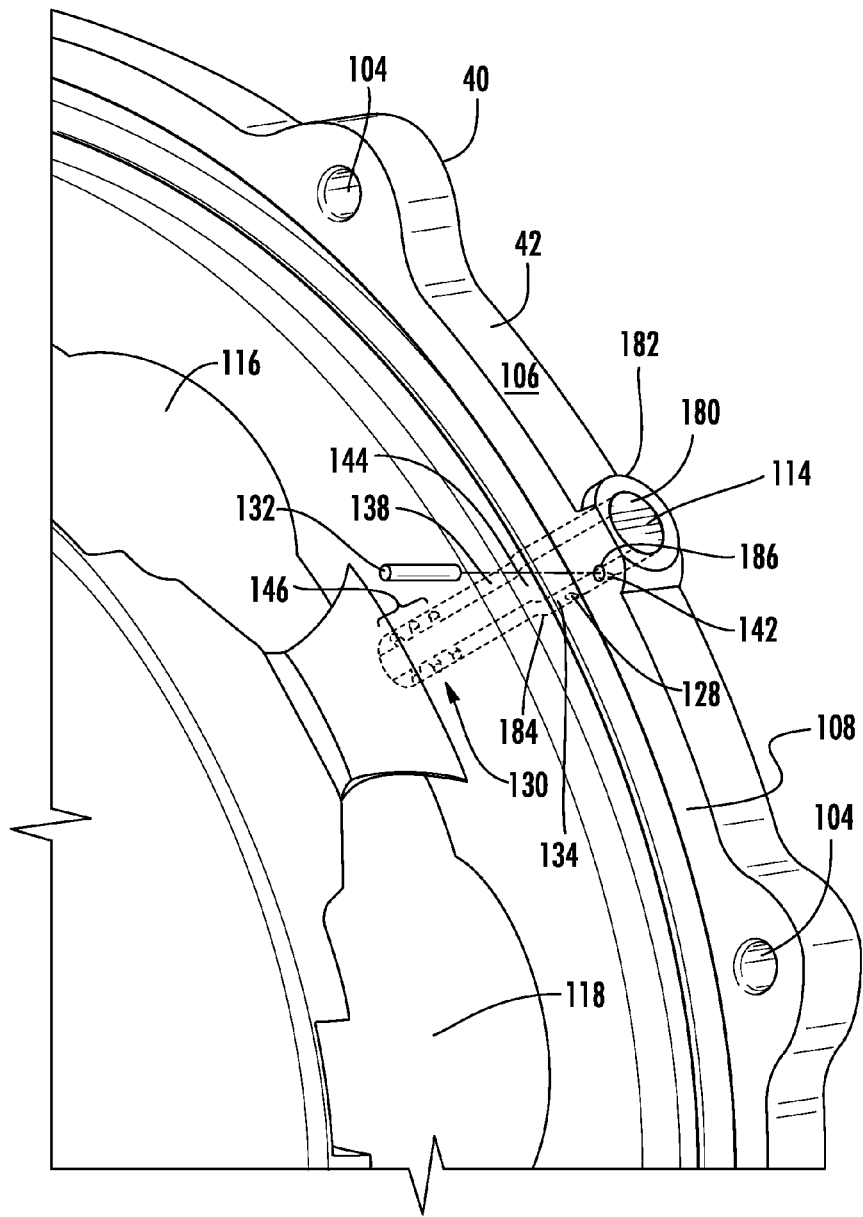
FIG. 12 is a perspective view similar to FIG. 11 with the fluid conduit positioned in the case.

Referring now to FIG. 5, the conduit 114 is shown secured to the case 40 by a retaining pin 132 of the retaining pins 46. Specifically, the retaining pin 132 is engaged with the conduit 114 and the case 40 to secure the conduit 114 to the case 40 in a predetermined orientation. The conduit 114 and the case 40 are configured to receive the retaining pin 132 so that the conduit 114 and the case 40 are coupled to one another via the retaining pin 132, thereby preventing the conduit 114 from moving relative to the case 40 and securing the conduit 114 to the case 40 in the predetermined orientation. Specifically, when the notch 142 formed in the conduit 114 is aligned with a notch 186 formed in the case 40 (as best seen in FIG. 12), the retaining pin 132 is received in the notches 142, 186 to couple the conduit 114 to the case 40.

The section 134 of the fluid conduit 114 is illustratively engaged with the retaining pin 132 as shown in FIG. 5. As described in greater detail below, the retaining pin 132 is received in the notch 142 of the fluid conduit 114 when the fluid conduit 114 is installed in the predetermined orientation in the case 40. Additionally, the section 134 is directly engaged with the case 40 when the fluid conduit 114 is installed in the case 40, as described in greater detail below.

When the fluid conduit 114 is installed in the case 40 as shown in FIG. 4, the section 138 extends radially inward from the section 134 relative to the axis 24 toward the spheres 116, 118. The cap 120 is positioned adjacent the flange 42, and the tip 122 is positioned in the central cavity 72. The cap 120 is illustratively arranged radially outward from the spheres 116, 118, and the tip 122 is illustratively arranged radially inward of the cap 120. The inlet 128 is aligned with the groove 48, and the outlet 130 is positioned between the spheres 116, 118.

The inlet 128 is aligned with and fluidly coupled to the groove 48 to receive fluid therefrom during operation of the variator 14 as indicated above. Fluid flow from the fluid source 12 to the inlet 128 may be adjusted to control the pressure at which fluid is conducted from the inlet 128 to the outlet 130, and thereafter to the spheres 116, 118. For instance, a single or multistage restriction orifice may be positioned at the inlet 128 to adjust fluid flow from the groove 48 to the inlet 128, and thus from the inlet 128 to the outlet 130. It should be appreciated, however, that in other embodiments, other suitable mechanisms may be employed to adjust the fluid flow from the source 12 to the inlet 128 and thereafter to the spheres 116, 118 via the outlet 130.

Figure 6:
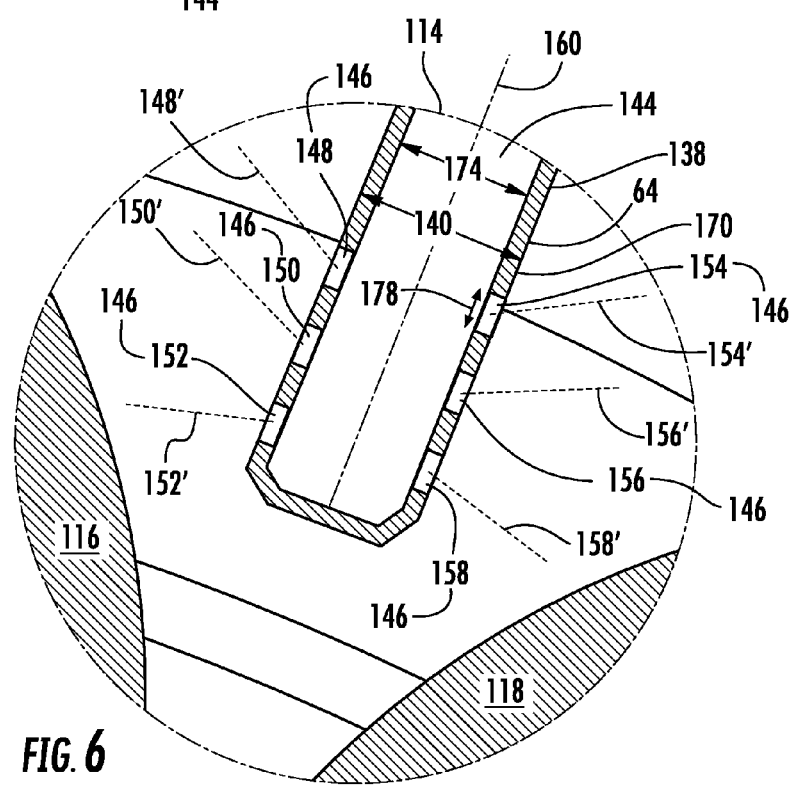
FIG. 6 is a detail view of an outlet of the fluid conduit of FIG. 4.

Referring now to FIGS. 5-6, the inlet 128 is fluidly coupled to the outlet 130 via a passageway 144. As such, fluid received by the conduit 114 at the inlet 128 is conducted to the outlet 130 via the passageway 144. The inlet 128 opens into the passageway 144, and a number of outlet ports 146 of the outlet 130 also open into the passageway 144. The notch 142, however, does not open into the passageway 144. The passageway 144 includes a section 144' formed in the section 134 of the tube 170 and a section 144" formed in the section 138 of the tube 170. The sections 144', 144" are interconnected, and the section 144' has a diameter 172 that is illustratively greater than a diameter 174 of the section 144".

The inlet 128 illustratively includes an opening 128' formed in the section 134 of the tube 170 as shown in FIG. 5. The opening 128' has a diameter 176 that is within the range of 3.0 millimeters to 3.5 millimeters. It should be appreciated, however, that in other embodiments, the opening 128' may have a diameter 176 that is within another range suitable for use of the conduit 114 in the variator 14 as described above.

The outlet 130 illustratively includes a number of output ports 146 as shown in FIG. 6. Each output port 146 has a diameter 178 that is within the range of 1.0 millimeter to 1.5 millimeters. It should be appreciated, however, that in other embodiments, the output ports 146 may have a diameter 178 that is within another range suitable for use of the conduit 114 in the variator 14 as described above. The output ports 146 are positioned relative to one another to direct fluid conducted to the outlet 130 by the inlet 128 via the passageway 144 along a number of different fluid paths. To that end, as described in greater detail below, the output ports 146 extend along a number of different axes to define the different fluid paths.

Referring now to FIG. 6, the output ports 146 of the outlet 130 are each configured to deliver fluid conducted radially inward from the inlet 128 to the outlet 130 to one of the spheres 116, 118. The output ports 146 illustratively include six output ports. It should be appreciated, however, that in other embodiments, the output ports 146 may include more or less than six output ports depending on the desired distribution of fluid to the spheres 22.

The output ports 146 of the outlet 130 are illustratively arranged to ensure the fluid conduit 114 provides sufficient fluid to the spheres 116, 118 to cool and lubricate the spheres 116, 118 during operation of the variator 14, that is when the fluid conduit 114 is secured to the case 40 in the predetermined orientation as shown in FIG. 5. In that way, the predetermined orientation of the fluid conduit 114 relative to the case 40 is that which ensures the arrangement of the ports 146 provides sufficient fluid to the spheres 116, 118 to cool and lubricate the spheres 116, 118 during operation of the variator 14.

The outlet ports 146 of the outlet 130 are fluidly coupled and positioned adjacent to the spheres 116, 118 as shown in FIG. 6. In the illustrative arrangement, the output ports 146 are positioned in two groups of three opposite one another on an outer surface 64 of the fluid conduit 114 to deliver fluid to the spheres 116, 118. Specifically, output ports 148, 150, 152 are configured to deliver fluid to the sphere 116, and output ports 154, 156, 158 are positioned opposite the ports 148, 150, 152 on the surface 64 and configured to deliver fluid to the sphere 118. It should be appreciated, however, that in other embodiments, different arrangements of the output ports 146 may be employed. For instance, the output ports 146 may be arranged on the outer surface 64 along a line (not shown) extending substantially parallel to a longitudinal axis 160 defined by the fluid conduit 114.

The output ports 146 each extend along separate axes away from the passageway 144 through the outer surface 64 of the fluid conduit 114 as shown in FIG. 6. Specifically, the output ports 148, 150, 152 extend along respective longitudinal axes 148', 150', 152' away from the passageway 144 through the surface 64, and the output ports 154, 156, 158 extend along respective longitudinal axes 154', 156', 158' away from the passageway 144 through the surface 64. The respective longitudinal axes 148', 150', 152', 154', 156', 158' of the output ports 148, 150, 152, 154, 156, 158 define the paths along which fluid is delivered from the output ports 146 to the spheres 116, 118 during operation of the variator 14.

In the illustrative arrangement of the output ports 146 of the outlet 130, at least one of the output ports 146 is configured to deliver fluid radially inward to at least one of the spheres 116, 118. Specifically, the output port 152 is configured to deliver fluid radially inward along the path defined by the longitudinal axis 152' to the sphere 116, and the output port 158 is configured to deliver fluid radially inward along the path defined by the longitudinal axis 158' to the sphere 118. It should be appreciated, however, that the arrangement of the axes 148', 150', 152', 154', 156', 158' depends on the amount of fluid required by the spheres 116, 118 during operation of the variator 14. In some operating conditions, for instance, one or more of the output ports 148, 150, 154, 156 may be formed through the outer surface 64 to deliver fluid radially inward to the spheres 116, 118, like the output ports 152, 158. In other operating conditions, however, only one of the output ports 148, 150, 152, 154, 156, 158 may be formed through the outer surface 64 to deliver fluid radially inward to the spheres 116, 118.

In operation, fluid may be supplied from the fluid source 12 at the pressure 102 to the torque transmitting mechanisms 18 via the hydraulic circuit 16. Fluid may also be supplied from the fluid source 12 at the variator pressure 100 to the spheres 22 via the variator hydraulic circuit 30. To do so, fluid may be conducted from the inlets 34 of the fluid conduits 32 to the outlets 36 of the fluid conduits 32. Furthermore, to supply fluid from the source 12 at the variator pressure 100 to the spheres 22, fluid may be delivered to the inlets 34 through the case 40. To deliver fluid to the inlets 34 through the case 40, fluid may be circulated to the inlets 34 around the central axis 24 via the groove 48.

Figure 7:
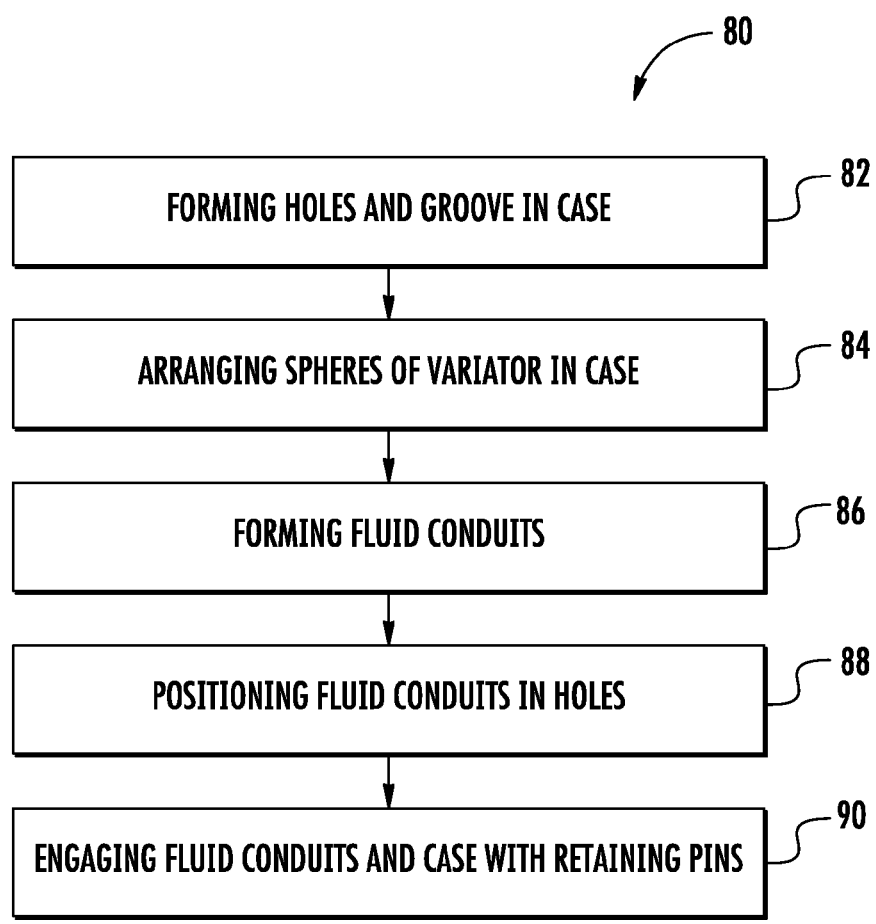
FIG. 7 is a simplified block diagram of a method of making the variator of FIG. 1.

Referring now to FIG. 7, a method 80 for making the variator 14 is shown. As described in greater detail below, the method 80 includes forming a number of holes 68 and the groove 48 in the case 40. The method 80 additionally includes arranging the spheres 22 in the case 40, forming the fluid conduits 32, and positioning the fluid conduits 32 in the holes 68 of the case 40. The method 80 also includes engaging the fluid conduits 32 and the case 40 with the retaining pins 46 to secure the conduits 32 to the case 40. It should be appreciated that the method 80 may be performed in a number of sequences other than the illustrative sequence of FIG. 7. For example, the method 80 may be performed by arranging the spheres 22 in the case 40 after engaging the fluid conduits 32 and the case 40 with the retaining pins 46 to secure the conduits 32 to the case 40.

Figure 9:
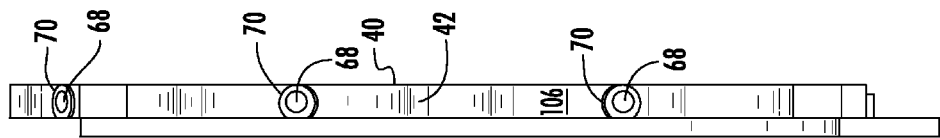
FIG. 9 is a plan view of the case of FIG. 8.
Figure 8:
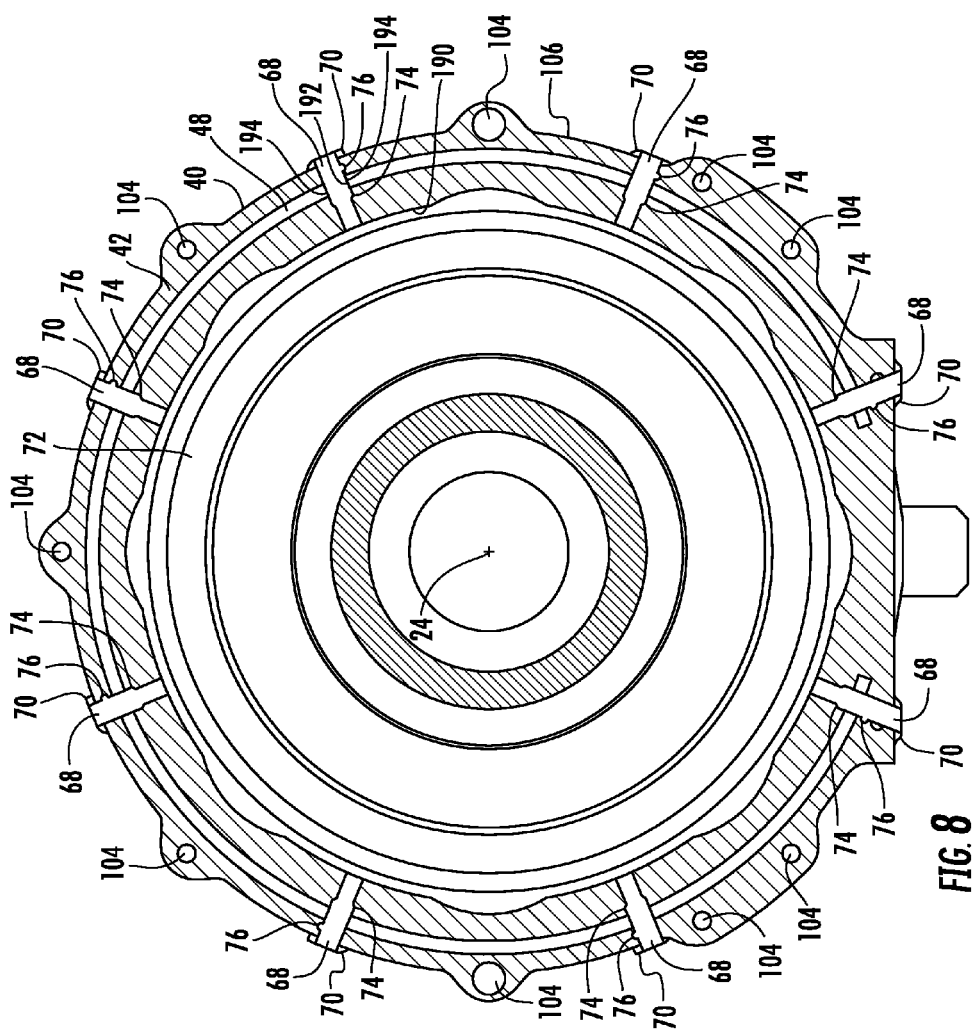
FIG. 8 is a front sectional view of the case of the variator of FIG. 1.

Referring now to FIGS. 8-9, the method 80 begins with block 82 in which the number of holes 68 and the groove 48 are formed in the case 40. The holes 68 may be cast into the metallic case 40. Alternatively, the holes 68 may be machined into the case 40 after the case 40 has been produced. In any case, the holes 68 are formed in the case 40 such that the holes 68 extend radially inward through substantially D-shaped projections 70 of the flange 42 extending outwardly from the surface 106 and open into the central cavity 72. It should be appreciated, however, that in other embodiments, the projections 70 may take the shape of other suitable geometric forms. The groove 48 is formed in the circumferential face 108 of the case 40 so that the groove 48 extends substantially around the central axis 24 as indicated above. Like the holes 68, the groove 48 may be cast into the case 40, or machined into the case 40 after the case 40 has been produced.

Each of the holes 68 is illustratively counterbored and defined by a sidewall 192 of the case 40. As such, each hole 68 extends radially inward through the projection 70, past a shoulder 74 included in the sidewall 192, and into the central cavity 72 as shown in FIG. 8. When the fluid conduits 32 are positioned in the holes 68, as described in greater detail below with reference to FIG. 11, the first section 134 of each of the fluid conduits 32 is engaged with one of the shoulders 74 of the case 40.

Each of the holes 68 illustratively includes a pair of groove openings 194 at which the groove 48 opens into and is thereby fluidly coupled to each of the holes 68. The groove openings 194 are formed in each sidewall 192 of the case 40, and the groove openings 194 are positioned radially outward of the shoulders 74 of the case 40 as shown in FIG. 8.

Each of the holes 68 illustratively includes a notch 76 that is positioned radially outward of the groove openings 194 and sized to receive one of the retaining pins 46 as shown in FIG. 8. As such, once the fluid conduits 32 are positioned in the holes 68 in the predetermined orientations, the retaining pins 46 are received in the notches of the holes 68 and the fluid conduits 32 (e.g., notch 76 of one hole 68 and notch 142 of the fluid conduit 114) when the retaining pins 46 are engaged with the fluid conduits 32 and the case 40. In that way, the fluid conduits 32 are secured to the case 40 in the predetermined orientations, as described in greater detail below with reference to FIG. 12.

Referring back to FIG. 7, the method 80 proceeds to block 84 in which the spheres 22 are arranged circumferentially about the central axis 24 in the central cavity 72. Specifically, the spheres 22 are arranged circumferentially about the central axis 24 in the central cavity 72 so that the spheres 22 are positioned radially inward of the case 40 and the groove 48 formed in the case 40.

Referring now to FIG. 10, the method 80 proceeds to block 86 in which the fluid conduits 32 are formed. For the sake of simplicity, block 86 is described below only with reference to fluid conduit 114 shown in FIGS. 4-6 and described herein. Initially, forming the fluid conduit 114 includes providing the cylindrical tube 170 with the sections 134, 138. To do so, the tube 170 may be stamped, forged, rolled, or drilled from a substrate. In one example, the tube 170 may be formed from a metallic substrate such as aluminum or steel so that the tube 170 has a metallic, unitary (i.e., monolithic) construction. In another example, the tube 170 may be formed in multiple pieces from a metallic substrate such as aluminum or steel. It should be appreciated, however, that in other embodiments, the tube 170 may be formed from a non-metallic substrate such as a polymeric substrate, for instance.

To form the fluid conduit 114 in block 86, the passageway 144, the inlet 128, and the notch 142 are formed in the tube 170. The fluid conduit 114 may be formed by machining the passageway 144, the inlet 128, and the notch 142 into the tube 170. For example, the features 144, 128, 142 may be laser-machined (e.g., drilled, milled, formed, etc.) into the tube 170 to form the fluid conduit 114.

Additionally, to form the fluid conduit in block 86, the outlet 130 including the plurality of output ports 146 is formed in the tube 170. The output ports 146 are formed in an arrangement that ensures the conduit 114 provides sufficient fluid to the spheres 116, 118 during operation of the variator 14, that is when the conduit 114 is secured in the predetermined orientation to the case 40. The output ports 146 are illustratively formed in two groups of three, as described above with reference to FIG. 6, but it should be appreciated that the output ports may be formed in other suitable arrangements. The outlet 130 is formed by forming the output ports 148, 150, 152, 154, 156, 158 along their respective axes 148', 150', 152', 154', 156', 158' to define the paths along which fluid is delivered to the spheres 116, 118, as described above with reference to FIG. 6. In this way, at least one of the ports 148, 150, 152, 154, 156, 158 is formed to deliver fluid radially inward to at least one of the spheres 116, 118, as described above with reference to FIG. 6. As described above with respect to the features 144, 128, 142, the fluid conduit 114 may be formed by laser-machining the output ports 146 of the outlet 130.

Referring now to FIG. 11, the method 80 proceeds to block 88 in which the fluid conduits 32 are positioned in the holes 68 of the case 40. For the sake of simplicity, block 88 is described below only with reference to fluid conduit 114 and a hole 180 (i.e., of the holes 68) of the case 40. Initially, the fluid conduit 114 is aligned with the hole 180 that extends radially inward through a projection 182 (i.e., of the projections 70) in preparation for positioning the fluid conduit 114 in the hole 180.

After the fluid conduit 114 is aligned with the hole 180, the fluid conduit 114 is advanced into the hole 180 until the section 134 is engaged with a shoulder 184 (i.e., of the shoulders 74) to position the conduit 114 in the hole 180, as shown in FIG. 11. When the section 134 is engaged with the shoulder 184, the inlet 128 is positioned radially outward of the spheres 22, and the outlet 130 is positioned radially inward of the inlet 128 as shown in FIG. 3.

Preferably, the fluid conduit 114 is advanced into the hole 180 with the output ports 146 oriented relative to the spheres 116, 118 in the same fashion that the ports 146 are oriented relative to the spheres 116, 118 when the conduit 114 is positioned in the hole 180 in the predetermined orientation, as shown in FIG. 11. When the section 134 is engaged with the shoulder 184, and once the fluid conduit 114 has been placed in the predetermined orientation in the hole 180, the inlet 128 is fluidly coupled to the groove 48. Furthermore, when the section 134 is engaged with the shoulder 184, and once the fluid conduit 114 has been placed in the predetermined orientation in the hole 180, at least one of the output ports 146 is positioned between the spheres 116, 118 to deliver fluid radially inward to at least one of the spheres 116, 118, as shown in FIGS. 5-6. Finally, when the section 134 is engaged with the shoulder 184, and once the fluid conduit 114 has been placed in the predetermined orientation in the hole 180, a notch 186 (i.e., of the notches 76) is aligned with the notch 142 of the fluid conduit 114 in preparation for receiving the retaining pin 132.

If the fluid conduit 114 is not in the predetermined orientation when the section 134 is engaged with the shoulder 184 in the hole 180, the fluid conduit 114 may be rotated relative to the case 40 to the predetermined orientation. Specifically, the fluid conduit 114 may be rotated about an axis 188 relative to the case 40 to the predetermined orientation before being engaged with the retaining pin 132 to secure the fluid conduit 114 to the case 40 in the predetermined orientation. When the fluid conduit 114 is positioned in the hole 180, the axis 188, the longitudinal axis 160 of the conduit 114, and a longitudinal axis 196 of the hole 180 are aligned with one another, and each of the axes 188, 160, 196 is arranged orthogonal to the central axis 24. After the fluid conduit 114 is installed in the hole 180 in the predetermined orientation, the other fluid conduits 32 may be installed in the other holes 68 in the predetermined orientations in preparation for securing the fluid conduits 32 to the case 40 in the predetermined orientations.

Referring now to FIG. 12, the method 80 proceeds to block 90 in which the fluid conduits 32 and the case 40 are engaged with the retaining pins 46 to secure each of the fluid conduits 32 to the case 40 in the predetermined orientation. For the sake of simplicity, block 90 is described below only in reference to the fluid conduit 114, the hole 180, and the retaining pin 132. Initially, the orientation of the fluid conduit 114 in the hole 180 is assessed to determine whether the fluid conduit 114 is in the predetermined orientation. If it is determined that the fluid conduit 114 is not in the predetermined orientation in the hole 180, the fluid conduit 114 may be rotated relative to the case 40 to the predetermined orientation, as indicated above.

Once the fluid conduit 114 is determined to be in the predetermined orientation in the hole 180, the retaining pin 132 is advanced into the notches 142, 186 that are aligned with one another as indicated above. The retaining pin 132 is advanced into the notches 142, 186 until the retaining pin 132 is engaged with each of the section 134 of the fluid conduit 114 and the case 40 to secure the fluid conduit 114 to the case 40 in the predetermined orientation, as shown in FIG. 12. When the retaining pin 132 is engaged with the fluid conduit 114 and the case 40 and the fluid conduit 114 is secured to the case 40 in the predetermined orientation, the retaining pin 132 is positioned radially inward of the case 40.

Referring to FIGS. 1-12, the variator 14 may be referred to herein as an assembly 14 that includes the components described above. In other words, the assembly 14 may include the case 40, the spheres 22, and the fluid conduits 32 described above as being included in the variator 14.

While the disclosure has been illustrated and described in detail in the drawings and foregoing description, such an illustration and description is to be considered as merely illustrative and not restrictive in character, it being understood that only illustrative embodiments have been shown and described and that all changes and modifications that come within the spirit of the disclosure are desired to be protected.

The invention claimed is:

1. A variator for an automatic transmission, the variator comprising:
   a plurality of spheres arranged circumferentially about a central axis and configured to be positioned between an input disc and an output disc, and
   a plurality of fluid conduits, each of the plurality of fluid conduits including (i) an inlet positioned radially outward of the plurality of spheres and (ii) an outlet positioned radially inward of the inlet, the outlet being fluidly coupled to the inlet to deliver fluid received by the inlet to at least one of the plurality of spheres.

2. The variator of claim 1, comprising a case that includes a flange that is positioned radially outward from the plurality of spheres, wherein the plurality of fluid conduits extend radially inward from the case.

3. The variator of claim 2, wherein the case is configured to engage a housing of the transmission.

4. The variator of claim 2, further comprising a plurality of retaining pins positioned radially inward of the case, wherein each of the plurality of retaining pins is engaged with one of the plurality of fluid conduits and the case to secure each of the plurality of fluid conduits to the case in a predetermined orientation.

5. The variator of claim 4, wherein (i) each of the plurality of fluid conduits includes a first section having a first diameter and a second section extending radially inward from the first section and having a second diameter less than the first diameter, and (ii) the first section of each of the plurality of fluid conduits is engaged with one of the plurality of retaining pins.

6. The variator of claim 4, wherein (i) the case includes a groove that extends substantially around the central axis and is positioned radially outward from the plurality of spheres, and (ii) the plurality of retaining pins are positioned radially outward from the groove.

7. The variator of claim 1, wherein (i) the outlet of each of the plurality of fluid conduits comprises a plurality of output ports, and (ii) at least one of the plurality of output ports is configured to deliver fluid radially inward to at least one of the plurality of spheres.

8. The variator of claim 7, wherein each of the fluid conduits is formed to include a passageway that extends radially inward from the inlet to fluidly couple the inlet to each of the plurality of output ports.

9. An assembly comprising:
a case including (i) a flange having an outer surface, (ii) a plurality of holes that extend radially inward through the outer surface, and (iii) a groove that extends substantially around a central axis and is configured to receive fluid,
a plurality of spheres arranged circumferentially about the central axis and positioned radially inward of the groove, and
a plurality of fluid conduits positioned in the plurality of holes, each of the plurality of fluid conduits including (i) an inlet fluidly coupled to the groove to receive fluid therefrom and (ii) an outlet positioned radially inward of the inlet, the outlet being fluidly coupled to the inlet to deliver fluid received by the inlet to at least one of the plurality of spheres.

10. The assembly of claim 9, wherein the case is configured to engage a housing of a transmission.

11. The assembly of claim 9, comprising a plurality of retaining pins positioned radially inward of the case, wherein each of the plurality of retaining pins is engaged with one of the plurality of fluid conduits and the case to secure each of the plurality of fluid conduits to the case in a predetermined orientation.

12. The assembly of claim 11, wherein (i) each of the plurality of fluid conduits includes a first section having a first diameter and a second section extending radially inward from the first section and having a second diameter less than the first diameter, and (ii) the first section of each of the plurality of fluid conduits is engaged with one of the plurality of retaining pins.

13. The assembly of claim 12, wherein (i) each of the plurality of holes is a counterbored hole that extends radially inward from one of a plurality of shoulders of the case, and (ii) the first section of each of the plurality of fluid conduits is engaged with one of the plurality of shoulders of the case.

14. The assembly of claim 9, wherein (i) the outlet of each of the plurality of fluid conduits comprises a plurality of output ports, and (ii) at least one of the plurality of output ports is configured to deliver fluid radially inward to at least one of the plurality of spheres.

15. The assembly of claim 14, wherein the plurality of output ports comprises three output ports configured to deliver fluid to at least one of the plurality of spheres.

16. The assembly of claim 14, wherein each of the plurality of output ports has a diameter within the range of 1.0 millimeter to 1.5 millimeters.

17. The assembly of claim 9, wherein the inlet of each of the plurality of fluid conduits has a diameter within the range of 3.0 millimeters to 3.5 millimeters.

18. A transmission comprising:
a variator including (i) a plurality of spheres arranged circumferentially about a central axis between an input disc and an output disc, and (ii) a variator hydraulic circuit fluidly coupled to a fluid source and configured to deliver fluid supplied by the fluid source to the plurality of spheres at a variator pressure, the variator hydraulic circuit having a plurality of fluid conduits each configured to conduct fluid from an inlet of each of the plurality of fluid conduits that is positioned radially outward of the plurality of spheres to an outlet of each of the plurality of fluid conduits that is positioned radially inward of the inlet to deliver fluid to at least one of the plurality of spheres, and
a first hydraulic circuit fluidly coupled to the fluid source and configured to deliver fluid supplied by the fluid source to first torque transmitting mechanisms of the transmission separate from the plurality of spheres at a first pressure different from the variator pressure.

19. The transmission of claim 18, wherein the inlet of each of the plurality of fluid conduits has a diameter within the range of 3.0 millimeters to 3.5 millimeters.

20. The transmission of claim 19, wherein (i) the outlet of each of the plurality of fluid conduits comprises a plurality of output ports, and (ii) each of the plurality of output ports has a diameter within the range of 1.0 millimeter to 1.5 millimeters.

* * * * *